(12) United States Patent
Rodriguez et al.

(10) Patent No.: US 7,172,304 B2
(45) Date of Patent: Feb. 6, 2007

(54) ILLUMINATOR HAVING FORWARD LIGHTING

(75) Inventors: Carlos M. Rodriguez, Palm Harbor, FL (US); Waldemar H. Tunkis, Palm Harbor, FL (US); Todd Conard, Ruskin, FL (US); Patrick Murphy, Riverview, FL (US); Ronald Joseph Dean, Riverview, FL (US); Bradley S. Davis, Largo, FL (US); Michael Goldenberg, Melbourne, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

(21) Appl. No.: 11/307,999

(22) Filed: Mar. 2, 2006

(65) Prior Publication Data

US 2006/0268539 A1    Nov. 30, 2006

Related U.S. Application Data

(60) Provisional application No. 60/595,003, filed on May 26, 2005.

(51) Int. Cl.
*G02B 27/02* (2006.01)

(52) U.S. Cl. .......................... 362/97; 362/98; 349/200; 359/802

(58) Field of Classification Search ................ 362/97, 362/98; 349/200; 359/802
See application file for complete search history.

(56) References Cited

U.S. PATENT DOCUMENTS

| | | | |
|---|---|---|---|
| 4,928,170 A | 5/1990 | Soloveychik et al. | |
| 5,168,405 A * | 12/1992 | Feinbloom | 359/802 |
| 5,325,123 A | 6/1994 | Bettinardi | |
| 5,633,674 A | 5/1997 | Trulaske et al. | |
| 5,729,283 A | 3/1998 | Meyer et al. | |
| 5,748,228 A | 5/1998 | Kobayashi et al. | |
| 5,959,605 A | 9/1999 | Gilblom | |
| 6,295,390 B1 * | 9/2001 | Kobayashi et al. | 382/313 |
| 6,483,651 B1 * | 11/2002 | Maurer | 359/819 |
| 6,731,326 B1 | 5/2004 | Bettinardi | |

(Continued)

FOREIGN PATENT DOCUMENTS

JP    09238232    9/1997

(Continued)

*Primary Examiner*—Renee Luebke
*Assistant Examiner*—Mary Zettl
(74) *Attorney, Agent, or Firm*—Ronald E. Smith; Smith & Hopen, P.A.

(57) ABSTRACT

A box-like illuminator includes a top wall having a flat sheet of clear material through which an illuminated image is viewed. A bottom wall of the illuminator is also formed of a flat sheet of clear material and is positioned atop the object to be illuminated. Light from an LED is directed in a first, downward direction onto a deflection wall where it is deflected into a substantially horizontal plane, substantially orthogonal to the first direction. The deflected light impinges upon a horizontally-disposed diffuser that bends the light about ninety degrees so that it travels though the diffuser a first time in a first direction and illuminates the object atop which the illuminator is positioned. The light is then reflected by the object, travels upwardly through the diffuser a second time in a direction opposite to the first direction, and is viewed by the user through the clear material.

5 Claims, 1 Drawing Sheet

U.S. PATENT DOCUMENTS

| | | |
|---|---|---|
| 6,791,600 B1 | 9/2004 | Chan |
| D503,732 S | 4/2005 | Hogrebe et al. |
| 6,907,390 B1 | 6/2005 | Reffner et al. |
| 6,912,301 B1 | 6/2005 | Lin et al. |
| 6,956,616 B2 | 10/2005 | Jung et al. |
| 2001/0019662 A1 | 9/2001 | Shono |
| 2002/0145813 A1 | 10/2002 | Jung et al. |
| 2004/0189847 A1 | 9/2004 | Hogrebe et al. |
| 2004/0246340 A1 | 12/2004 | Sukenari et al. |
| 2005/0024530 A1 | 2/2005 | Schuttinger |
| 2005/0062847 A1 | 3/2005 | Johnston |
| 2005/0122396 A1 | 6/2005 | Mizukami et al. |
| 2005/0162512 A1 | 7/2005 | Seakins |
| 2006/0092170 A1 * | 5/2006 | Bathiche et al. ............ 345/589 |

FOREIGN PATENT DOCUMENTS

| | | |
|---|---|---|
| JP | 09322045 | 12/1997 |
| JP | 11225328 | 8/1999 |
| JP | 2003348418 | 12/2003 |
| JP | 2004364126 | 12/2004 |
| WO | 03083805 | 10/2003 |

* cited by examiner

ILLUMINATOR HAVING FORWARD LIGHTING

CROSS REFERENCE TO RELATED APPLICATIONS

This application claims priority to U.S. Provisional Patent Application No. 60/595,003, entitled: "Portable Electronic Magnifier," filed by the same inventors on May 26, 2005.

BACKGROUND OF INVENTION

1. Field of the Invention

This invention relates, generally, to illumination devices for people with low vision. More particularly, it relates to an illumination device that is placed a fixed distance above the object to be illuminated.

2. Description of the Prior Art

Illuminators for use by people with low vision are typically back-lit, i.e., a light source is located behind a surface upon which an image appears, so that the light shines towards the eyes of the viewer. The light source itself is typically an LED. Accordingly, the back-lighting that is provided is not uniform, there being intense spots of light intermingled with darker spots.

What is needed, then, is an illuminator that does not produce the light-and-dark patterns of light associated with back-lit illumination devices.

However, in view of the prior art taken as a whole at the time the present invention was made, it was not obvious to those of ordinary skill how such an illumination device could be constructed.

SUMMARY OF THE INVENTION

The long-standing but heretofore unfulfilled need for an illuminator that is not subject to the limitations of back-lit illuminators is now met by a new, useful, and non-obvious invention. The novel illuminator has a box-like construction with a hollow interior. It includes a top wall having an opening formed therein and a flat sheet of clear material mounted in the opening. The bottom wall is a flat sheet of clear material. A plurality of sidewalls interconnects the top wall and the bottom wall at their respective peripheries. The illuminator is adapted to sit atop an object to be illuminated so that the illuminator can be slideably moved with respect to the object with a low friction interface between the bottom wall and the object.

The illuminator further includes a light source adapted to emit light and a light guide that guides light emitted by the light source.

A diffuser is mounted in the hollow interior of the illuminator in parallel relation to the object at a fixed distance therefrom.

The light guide is adapted to guide light from the light source into a path of travel where the light travels substantially parallel to the diffuser so that the light is bent about ninety degrees (90°) by the diffuser. The light then passes through the diffuser in a first direction and impinges upon the object to be illuminated, thereby illuminating the object.

The light is reflected from the illuminated object and passes through the diffuser a second time in a direction opposite to the first direction. The object is viewed by a user through the flat sheet of clear material formed in the top wall.

The light source is preferably a source of white light, such as a white light emitting diode (LED).

The light guide is formed of a transparent material so that the viewer may see the illuminated object through the light guide.

The flat sheet of clear material through which the image is viewed may be formed of clear glass, acrylic, polycarbonate, or the like.

An important advantage is that the illuminated object is illuminated from the front and not the back, thereby eliminating the alternating areas of intense light and dark spots associated with back-lit illuminators.

Another advantage is that the novel illuminator has a very low profile.

These and other advantages will become apparent as this disclosure proceeds. The invention includes the features of construction, arrangement of parts, and combination of elements set forth herein, and the scope of the invention is set forth in the claims appended hereto.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
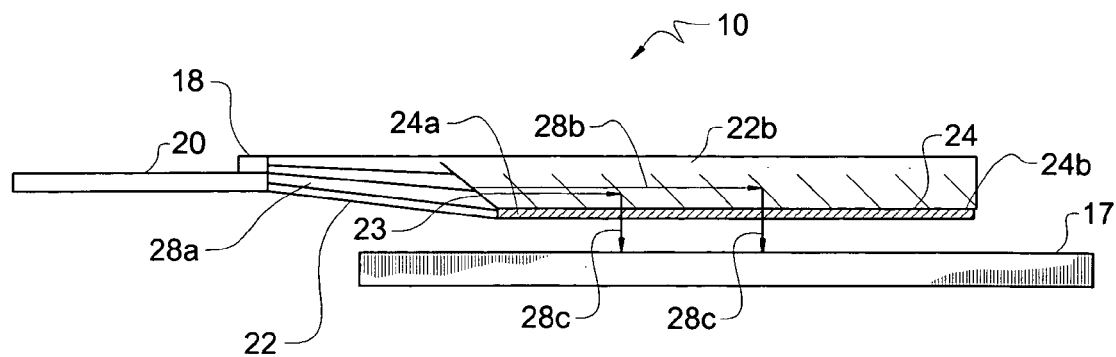
FIG. 1 is a diagrammatic view depicting the essential parts of the novel illuminator.
Figure 2:
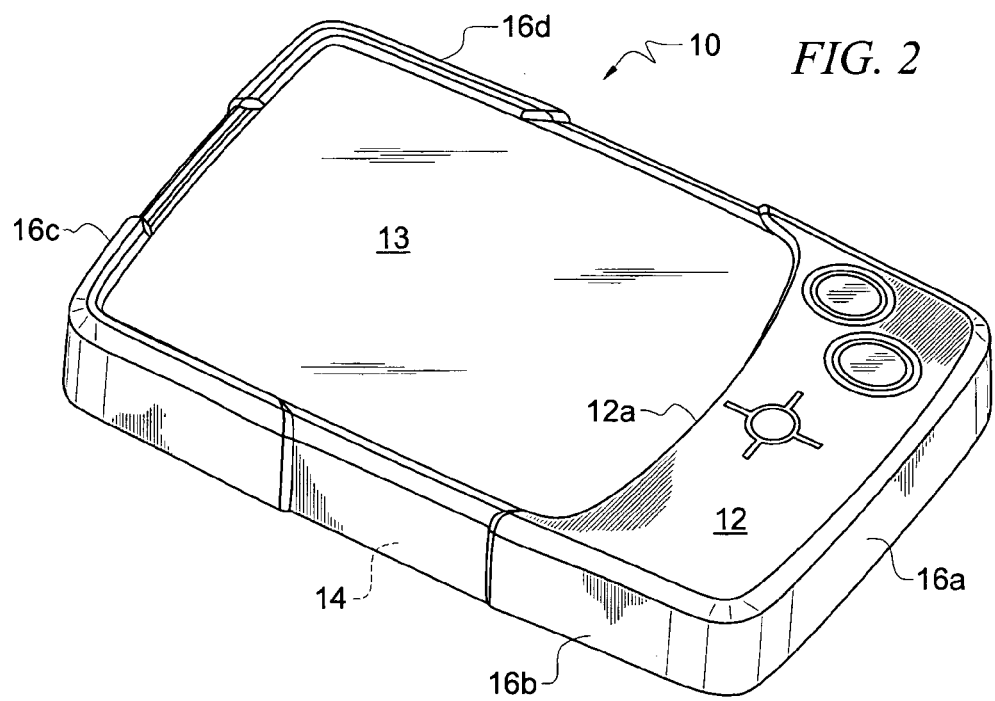
FIG. 2 is a perspective view of the illuminator housing in its fully assembled configuration.

Referring now to FIGS. 1 and 2, it will there be seen that an illustrative embodiment of the invention is denoted as a whole by the reference numeral 10.

Illuminator 10 has a box-like structure. Top wall 12 has an opening 12a formed therein within which is mounted a flat sheet of clear material 13. Bottom wall 14 is disposed in parallel relation to top wall 12 and is formed of a flat sheet of clear material. Sidewalls 16a, 16b, 16c, and 16d interconnect the top wall and the bottom wall. Bottom wall 14 slides atop object 17 with low frictional resistance as the user of the device uses illuminator 10 to read a page of text, for example.

Flat sheet of clear material 13 and bottom wall 14 may be formed of glass, plastic, acrylic, polycarbonate, or the like.

A white light emitting diode (LED) 18 is mounted to printed circuit board (PCB) 20. The PCB is positioned within the hollow interior of illuminator 10 in a plane parallel to the plane of object 17. The light emitted by LED 18 travels parallel to the plane of said object. Light guide 22 is also disposed substantially parallel to the plane of object 17. Deflection wall 23 is mounted at a substantially forty-five degree (45°) angle at the distal end of light guide 22 and the proximal end of diffuser 24 in this illustrated embodiment. In an unillustrated embodiment, said deflection wall is not used.

Significantly, light guide 22 is formed of transparent materials such as acrylic, polycarbonate, or the like.

Diffuser 24 is a light turning film and is mounted in underlying relation to light guide 22 so that the light from said light guide is substantially parallel to said diffuser. Diffuser 24 could also be formed integrally with said light guide 22. Diffuser 24 is positioned in the hollow interior of illuminator 10 in parallel relation to top wall 12 and bottom wall 14. Significantly, the vertical spacing between object 17 and diffuser 24 is fixed. The proximal end of diffuser 24 is denoted 24a and the distal end thereof is denoted 24b.

Diffuser 24 is commercially available from multiple sources, including Wavefront Technology, Inc., Physical Optics Corporation, and Omron Corporation. The brand names for such diffusers are Tailored Micro-Diffusers™ (TMDs), DTF® directional turning films, and Frontlight Technology™, respectively.

Diffuser 24 provides a uniform diffusion of light, thereby eliminating the bright spots associated with LEDs. Less power is consumed as well because the light from one LED is spread over a relatively large area by the diffuser. More than one LED 18 may be used where more illumination is required.

Light 28a travels through light guide 22 substantially horizontally from LED 18 as at 28a and passes through deflection wall 23 and continues to travel thereafter in a substantially horizontal plane as at 28b. Light 28b travels substantially parallel to diffuser 24. Diffuser 24 has a rough top surface so that light 28b travels parallel to said top surface until said light is bent by and passes through diffuser 24 in a first downward direction as at 28c and illuminates object 17. Light 28c is then substantially vertically reflected from object 17 and said light 28c then travels a second time through diffuser 24, in an upward direction opposite to the first direction, and through flat sheet of clear material 13 and is viewed by the user.

Although the invention is disclosed for the benefit of the low vision community, it has applications that extend beyond that application. It has uses in microscopy, ophthalmic instrumentation, surgical site illumination, doorway security devices, portable cosmetic mirrors, and more.

In microscopy applications, nanotech diffusion films could be applied over the focal lens thereby providing downward diffuse illumination instead of the traditional, upwardly-projected illumination.

In ophthalmic applications, the eye could be illuminated over multiple wavelengths and intensities in the substantial absence of a dilation-inducing intense light point.

In surgical applications, a surgical area could be lit by a transparent planar light guide and diffuser layer as disclosed herein. The surgeon would view the surgical site through the light source.

Conventional door peepholes could also be replaced with a transparent light guide and a diffuser. A visitor outside the door could not see through the illuminated light guide into the premises, but the visitor would be illuminated for the benefit of the person in the premises.

Portable cosmetic mirrors could use the diffusion illumination to better illuminate the user's face. Such a device could be small and would consume very little power.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An illuminator, comprising:
  a top wall having an opening formed therein;
  a flat sheet of clear material mounted in said opening formed in said top wall;
  a bottom wall formed of a flat sheet of clear material;
  a plurality of sidewalls disposed in interconnecting relation to said top wall and said bottom wall at the respective peripheries of said top wall and said bottom wall;
  said bottom wall being adapted to sit atop an object to be illuminated and to be slideably moved with respect to said object with a low friction interface between said bottom wall and said object;
  a light source adapted to emit light;
  a light guide that guides light emitted by said light source;
  a diffuser mounted in parallel relation to said object;
  said diffuser mounted a fixed distance from said object;
  said light guide adapted to guide light from said light source into a horizontal path of travel where said light travels substantially parallel to a rough top surface of said diffuser until said light is bent by and passes through said diffuser in a first downward direction so that said light is adapted to impinge upon said object;
  whereby said light passes through said diffuser a second time in an upward direction opposite to said first downward direction after reflecting from said object; and
  whereby said object is viewed by a user through said flat sheet of clear material formed in said top wall.

2. The illuminator of claim 1, further comprising:
  said light source being a source of white light.

3. The illuminator of claim 1, further comprising:
  said light source being at least one light-emitting diode.

4. The illuminator of claim 1, further comprising:
  said light guide being formed of a transparent material.

5. The illuminator of claim 1, further comprising:
  said flat sheer of clear material formed in said top wall and said flat sheet of material forming said bottom wall being a material selected from a group of clear material consisting of glass, plastic, acrylic, and polycarbonate.

* * * * *